(12) United States Patent
Passinger et al.

(10) Patent No.: US 9,047,763 B2
(45) Date of Patent: Jun. 2, 2015

(54) METHODS AND SYSTEMS FOR REPRESENTING TIME OF ARRIVAL INFORMATION ON A COCKPIT DISPLAY

(71) Applicant: HONEYWELL INTERNATIONAL INC., Morristown, NJ (US)

(72) Inventors: Bretislav Passinger, Prerov (CZ); Jiri Vasek, Brno (CZ); Jiri Svoboda, Okr. Novy Jicin (CZ); Michal Polansky, South Moravia (CZ)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 55 days.

(21) Appl. No.: 13/843,634

(22) Filed: Mar. 15, 2013

(65) Prior Publication Data

US 2014/0278069 A1    Sep. 18, 2014

(51) Int. Cl.
 G01C 21/12    (2006.01)
 G06G 7/00     (2006.01)
 G08G 5/00     (2006.01)
 G01C 23/00    (2006.01)

(52) U.S. Cl.
 CPC .............. G08G 5/0021 (2013.01); G01C 23/00 (2013.01)

(58) Field of Classification Search
 USPC .................................................. 701/465, 14
 See application file for complete search history.

(56) References Cited

U.S. PATENT DOCUMENTS

| | | | |
|---|---|---|---|
| 5,715,163 A * | 2/1998 | Bang et al. | 701/467 |
| 6,112,141 A * | 8/2000 | Briffe et al. | 701/14 |
| 6,381,519 B1 * | 4/2002 | Snyder | 701/3 |
| 6,449,556 B1 * | 9/2002 | Pauly | 701/467 |
| 6,507,782 B1 | 1/2003 | Rumbo et al. | |
| 6,633,810 B1 * | 10/2003 | Qureshi et al. | 701/467 |
| 7,437,225 B1 * | 10/2008 | Rathinam | 701/14 |
| 7,623,960 B2 | 11/2009 | Wise et al. | |
| 7,756,632 B2 * | 7/2010 | Wise et al. | 701/465 |
| 8,165,734 B2 | 4/2012 | Wachenheim et al. | |
| 8,244,466 B2 | 8/2012 | DeJonge et al. | |
| 8,285,427 B2 | 10/2012 | Rogers et al. | |
| 2010/0030467 A1 * | 2/2010 | Wise et al. | 701/204 |
| 2011/0077859 A1 | 3/2011 | Coulmeau et al. | |
| 2011/0137493 A1 | 6/2011 | Dacre-Wright et al. | |
| 2012/0004837 A1 | 1/2012 | McDonald | |
| 2012/0035841 A1 | 2/2012 | Polansky et al. | |
| 2012/0215435 A1 | 8/2012 | Subbu et al. | |

OTHER PUBLICATIONS

Rodriguez, J.M.C. et al.; A 4D Trajectory Negotiation Protocol for Arrival and Approach Sequencing; 978-1-4244-2304-0/08, 2008 IEEE.
Prevot, T. et al.; Trajectory-Oriented Time-Based Arrival Operations: Results and Recommendations; 4th USA/Europe Air Traffic Management Research and Development Seminar, Air-Ground Cooperation Track, Budapest, Hungary, 2003.

* cited by examiner

*Primary Examiner* — Thomas G Black
*Assistant Examiner* — Tyler Paige
(74) *Attorney, Agent, or Firm* — Ingrassia Fisher & Lorenz, P.C.

(57) ABSTRACT

A method is provided for displaying information on a display device of an aircraft. The method comprises receiving data indicating a point selected from a trajectory of a flight path; determining an estimated time of arrival minimum and an estimated time of arrival maximum based on the point; and displaying in a dialogue box associated with the trajectory of the flight path the estimated time of arrival minimum and the estimated time of arrival maximum for the point.

16 Claims, 5 Drawing Sheets

METHODS AND SYSTEMS FOR REPRESENTING TIME OF ARRIVAL INFORMATION ON A COCKPIT DISPLAY

TECHNICAL FIELD

The present disclosure generally relates to methods and systems for presenting flight information on a display, and more particularly relates to methods and systems of presenting required time of arrival information and estimated time of arrival information on a display of an aircraft.

BACKGROUND

An Air Traffic Controller (ATCo) may use voice radio communication to negotiate a Controlled Time of Arrival or a Controlled Time Over (CTA/CTO) clearance. Typically, for en-route planning of sequencing and merging or for strategic en-route de-confliction, the pilot might be asked for CTO on waypoint which is placed on a cleared three-dimensional trajectory, but is not part of the flight plan as named waypoint. Using the traditional method of waypoint entry, it would be unpractical and time consuming for the pilot to ascertain the Estimated Time of Arrival or Required Time of Arrival (ETA/RTA) for the waypoint if the pilot must first insert the waypoint into the flight plan and before the ETA/RTA calculation is performed. Such method of operation is lengthy and would be especially annoying if the ETA/RTA cannot be met and re-negotiation of CTA/CTO clearance would need to start.

Hence, there is a need for systems and methods for an interactively displaying estimated time of arrival and required time of arrival limits to the pilot in the aircraft. Other desirable features and characteristics will become apparent from the subsequent detailed description and the appended claims, taken in conjunction with the accompanying drawings and the foregoing technical field and background.

BRIEF SUMMARY

In one embodiment, a method is provided for displaying information on a display device of an aircraft. The method comprises receiving data indicating a point selected from a trajectory of a flight path; determining an estimated time of arrival minimum and an estimated time of arrival maximum based on the point; and displaying in a dialogue box associated with the trajectory of the flight path the estimated time of arrival minimum and the estimated time of arrival maximum for the point.

In another embodiment, a system is provided for displaying information on a display device of an aircraft. The system comprises an information datastore, and a computer module. The computer module receives data indicating a point selected from a trajectory of a flight path, determines an estimated time of arrival minimum and an estimated time of arrival maximum based on the point; and displays in a dialogue box associated with the trajectory of the flight path the estimated time of arrival minimum and the estimated time of arrival maximum for the point.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
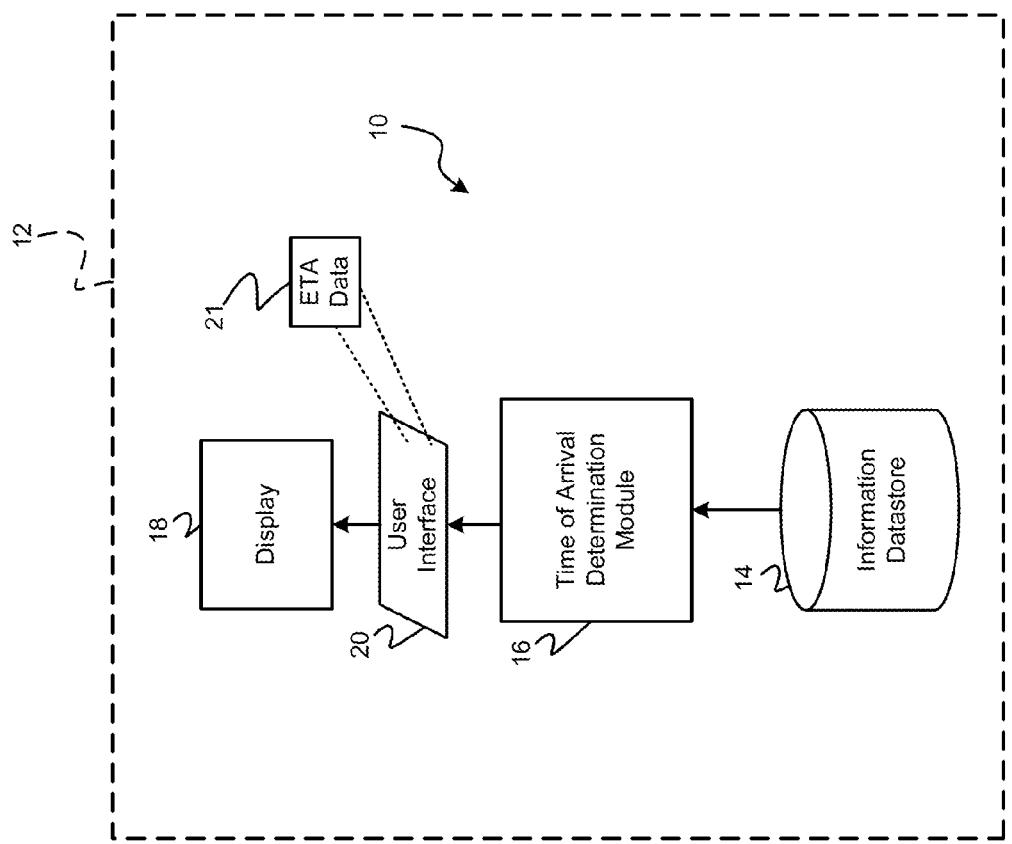
FIG. 1 is a functional block diagram illustrating a time of arrival system for an aircraft in accordance with exemplary embodiments.

Referring now to FIG. 1, exemplary embodiments of the present disclosure are directed to an electronic time of arrival system shown generally at 10 that is associated with an aircraft 12. As can be appreciated, the electronic time of arrival system 10 described herein can be implemented in any aircraft 12 having onboard a computing device that is associated with a display device, where the computing device includes at least a processor, and one or more data storage devices.

As shown in FIG. 1, the electronic time of arrival system 10 includes, but is not limited to, an information datastore 14, a time of arrival determination module 16, and a display 18. The information datastore 14 stores pre-calculated time of arrival data including, but not limited to, estimated time of arrival minimum and maximum predictions for given waypoints of a flight plan, optimal time of arrival, fuel predictions, impact on estimated time en-route (ETE), estimated time of arrival to destination (ETA), and the estimated distance to go (DTG), the estimated time of departure (ETD). The values are pre-calculated iteratively with an appropriate confidence envelope. As can be appreciated, the information datastore 14 may reside in a data storage device of the computing device on the aircraft 12, may reside in a data storage device on a computing device at a location remote from the aircraft 12 (e.g., on a central server), or may partially reside on the computing device of the aircraft 12 and partially on the computing device at the location remote from the aircraft 12.

The time of arrival determination module 16 includes a processor and one or more instructions that may be executed by the processor. In general, the instructions of the time of arrival determination module 16 access the information datastore 14, determine estimated time of arrival related information 21 based on information from the information datastore 14, and generate a user interface 20 having the estimated time of arrival related information 21. As can be appreciated, depending on the location of the information datastore 14, the time of arrival determination module 16 may communicate with the information datastore 14 directly, and/or may communicate with the information datastore 14 indirectly through one or more communication protocols.

The display 18 displays the user interface 20. The display 18 may be located in a cockpit of the aircraft 12 for viewing by, for example, a pilot of the aircraft 12. In various embodiments, the display 18 can be an interactive display (e.g., a touch screen, or other interactive display) that accepts user input from a user through one or more user input devices. For example, a pilot may interact with the user interface 20 using one or more input devices to display the estimated time of arrival related information 21. In another example, the user interface 20 may automatically display the time of arrival related information 21 based on a flight condition of the aircraft 12 and/or based on information entered by a user.

Figure 2A:
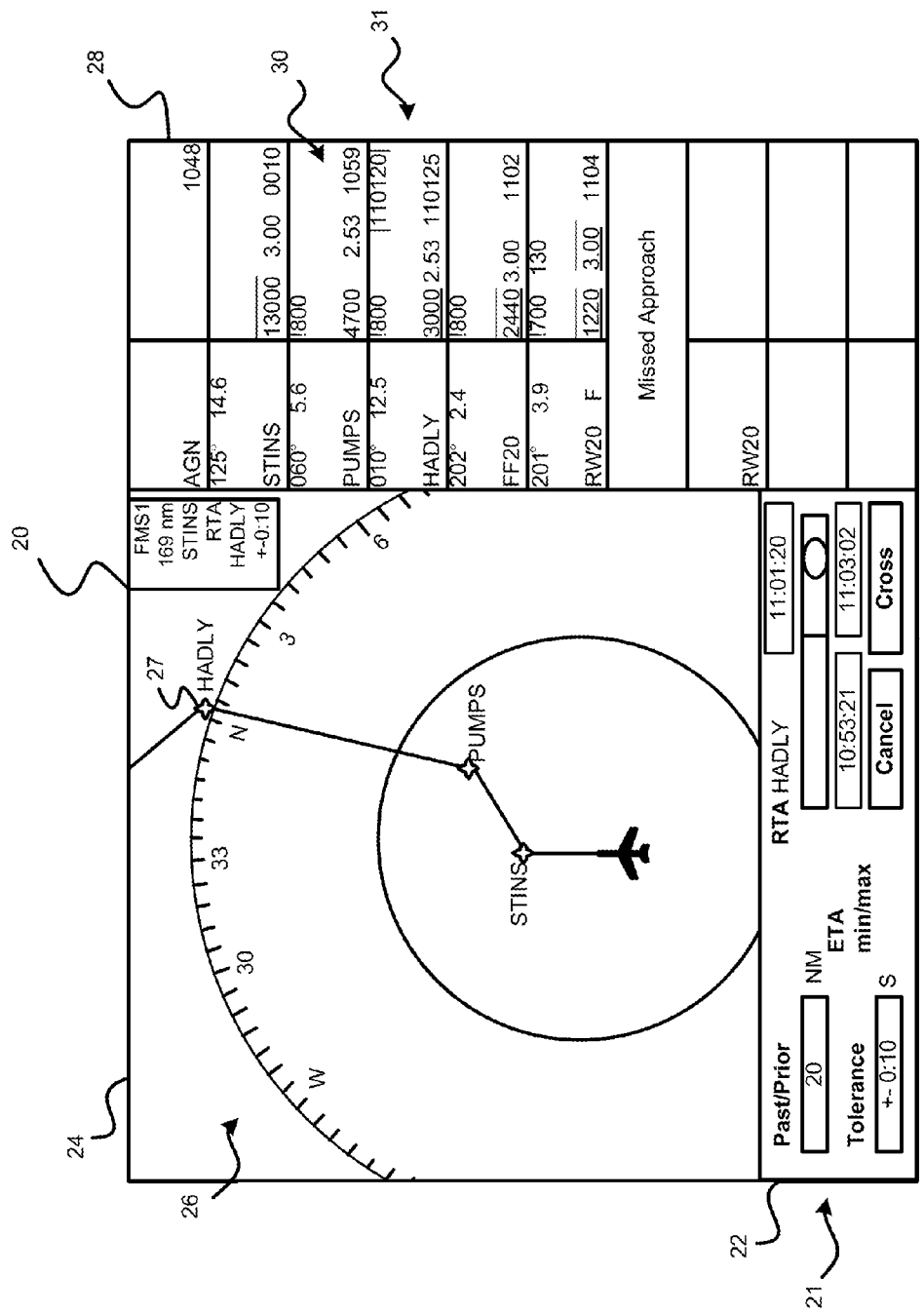
FIGS. 2A-2C are illustrations of graphical aids of a user interface that may be generated by a time of arrival determination module and displayed on a display device of the aircraft in accordance with exemplary embodiments.
Figure 2B:
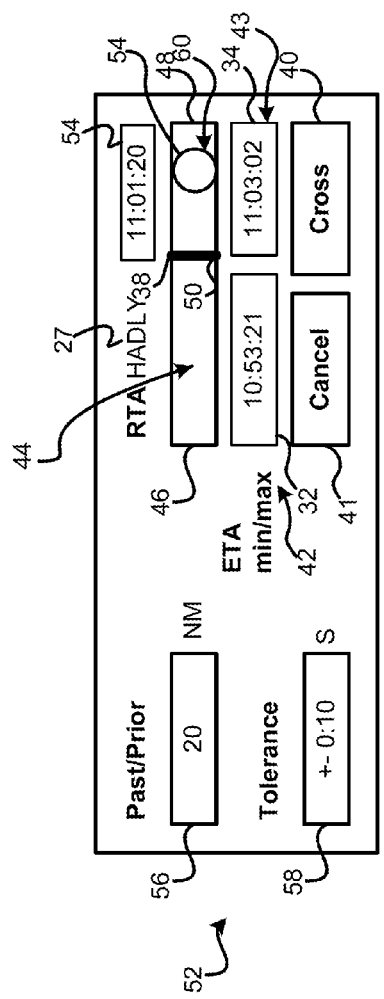

In various embodiments, as shown in FIGS. 2A-2B, the user interface 20 displays the time of arrival related information 21 in a dialogue box 22 that is associated with a display box 24 that displays a lateral flight plan 26. In various embodiments, the lateral light plan 26 includes an illustration of the trajectory of the aircraft 12 along a flight path (e.g., displayed in two or three dimensions) and the waypoint 27 related to a time constrained operation. In various embodiments, the user interface 20 can further include a data display box 28 that displays vertical situational information 30 associated with the flight path.

The dialogue box 22 displays the estimated time of arrival related information 21 to the pilot such that it can be used in the required time of arrival negotiation process between the Air Traffic Controller (ATCo) and the pilot. By means of the user interface 20 and the display methods discussed herein, the pilot can assess different solutions along any point of an already negotiated two or three-dimensional trajectory as requested by ATCo.

With reference to FIG. 2B, the time of arrival related information 21 displayed by the user interface 20 includes, but is not limited to, an estimated time of arrival (ETA) minimum value 32, an estimated time of arrival (ETA) maximum value 34, an optimal required time of arrival (RTA) value 38 for a particular point 27 on the flight path. In the example provided in FIG. 2B, the particular point 27 is identified as the waypoint named "Hadly" on FIG. 2A. As can be appreciated, the particular point 27 can be any point along the flight path and can be selected for example, by invoking a cross constraint entry command from within any point along the lateral flight path in the lateral flight plan 26 or from vertical situation information 30. In such case, the user interface 20 is populated by default data that is related to a selected item. In various other embodiments, the user interface is populated with time constrained point data by means of loading time constrained uplink clearance from datalink device (not shown). The selection of the particular point 27 can be canceled by selecting a cancel selection box 41. By means of a cross selection box 40, the negotiated data is entered into the lateral flight plan 26 and the vertical situation information 30.

Figure 2C:
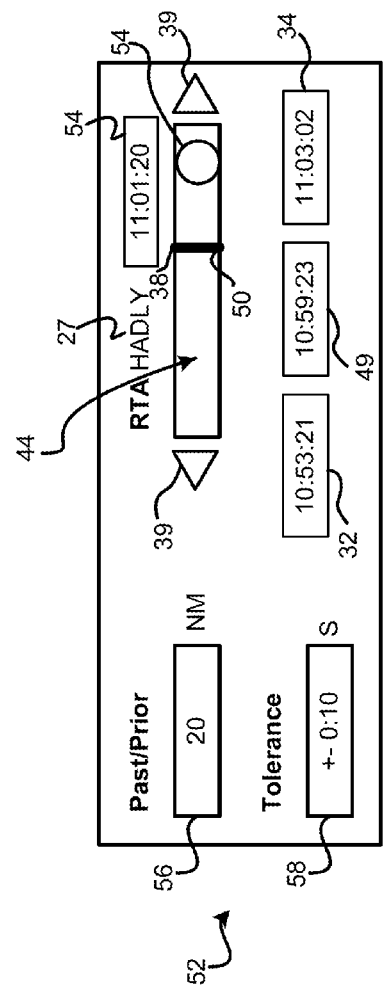

As shown in FIGS. 2B and 2C, the ETA minimum and maximum values 32, 34 can be displayed as a readout value as shown at 42 and 43 respectively. As further shown in FIG. 2B, the ETA minimum and maximum values 32, 34 can be displayed graphically as shown by the slider bar 44, where a first end 46 of the slider bar 44 represents the ETA minimum 32 and a second end 48 of the slider bar 44 represents the ETA maximum 34. The optimal RTA time 38 can be displayed as a readout 49 and/or graphically as shown at 50. For example, in the graphical depiction, the slider bar 44 includes an image 50 representing the optimal RTA time 38 (as shown as a vertical line, but can be any other image). The image 50 is displayed at a location on the slider bar 44 that represents its value between the ends 46, 48 representing the ETA minimum value 32 and the ETA maximum value 34.

As can be appreciated, other additional time of arrival related information 21 may include, but is not limited to, the ETA Destination, the DTG, and the ETD (e.g., in the case when the RTA is accepted when on the aircraft is on the ground). This information can be displayed in the display box 28 with the vertical situational information 30. The display box 28 can further display any of the time of arrival related information 21 for the particular point 27 as shown at 31.

In various embodiments, the time of arrival related information 21 can be based on required time of arrival entry data 52 that is entered by a user and displayed by the user interface 20. The required time of arrival entry data 52, includes, but is not limited to, a required time of arrival target (RTA) time 54, a distance offset 56, and a tolerance value for the RTA 58. The time of arrival entry data 52 can be entered by text input and/or using a tuning knob(s) or other input device. In various embodiments, the target RTA time 54 can be represented by an image 60 representing the target RTA time 54 (as shown as a circle but can be any other image or shape).

In various embodiments, the image 60 can change appearance (e.g., shape, color, etc.) based on its corresponding value. For example, the image 60 representing the target RTA time 54 may be a green circle (or other color) to indicate to the pilot an achievability of the target RTA time 54. As the green circle is pushed to either the ETA minimum value 32 or ETA maximum value 34 the green circle may change to another color circle indicating to the pilot that the target RTA time 54 is less achievable or to another shape. When the circle reaches an outer limit, the circle changes to yet another color such as amber (or other color) and or to another shape (e.g. as shown at 39 in example embodiments) to indicate that the target RTA time 54 is not achievable. Yet another means to indicate that target RTA time 54 is less achievable can be a change in background color or background pattern of relevant side of slider 44. As can be appreciated, any number of variations in the appearance can be used to illustrate the achievability of the target RTA time 54.

Figure 3:
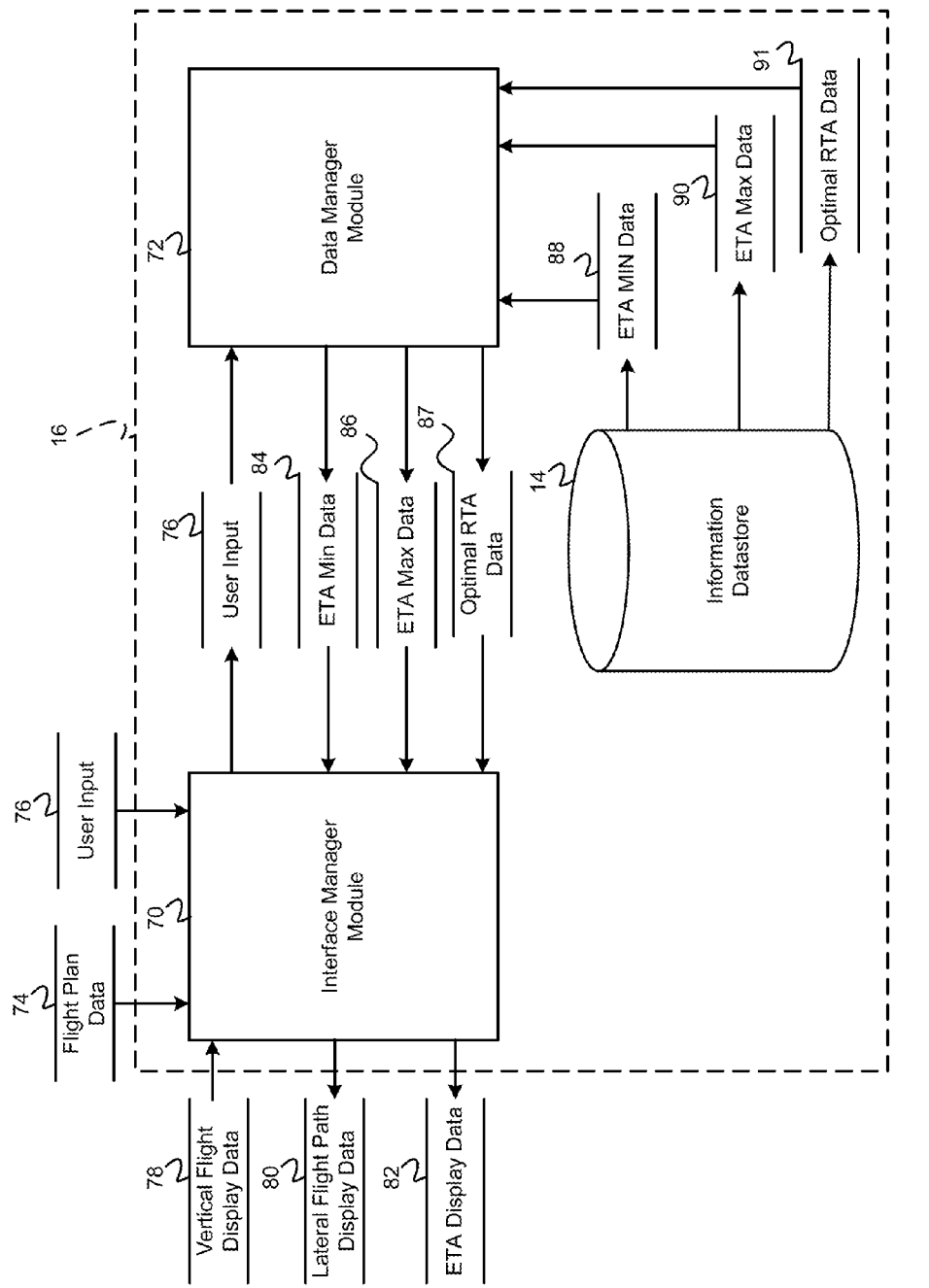
FIG. 3 is dataflow diagram illustrating a time of arrival determination module that communicates with an information datastore of the time of arrival system in accordance with exemplary embodiments.

Referring now to FIG. 3, a dataflow diagram illustrates various embodiments of the time of arrival determination module 16 of the electronic time of arrival system 10. Various embodiments of electronic time of arrival systems 10 according to the present disclosure may include any number of sub-modules embedded within the time of arrival determination module 16. As can be appreciated, the sub-modules shown in FIG. 3 may be combined and/or further partitioned to similarly determine and display the time of arrival related information 21. Inputs to the time of arrival determination module 16 may be received from other modules (not shown), determined/modeled by other sub-modules (not shown) within the time of arrival determination module 16, and/or may be user input that is based on a user interacting with the user interface 20. In various embodiments, the time of arrival determination module 16 includes an interface manager module 70, and a data manager module 72.

The interface manager module 70 receives as input flight plan data 74 and user input 76. The flight plan data 74 may be received from a flight plan datastore or other module in control of the flight plan. The user input 76 may be received based on a user interacting with the user interface 20 and can include the particular point 27, the target RTA time 54, the waypoint distance offset 56, and the RTA tolerance value 58. The interface manager module 70 manages the display of the lateral flight plan 26, the vertical situational information 30, and the time of arrival related information 21 based on the flight path data 74 and the user input 76, for example, by generating vertical flight display data 78, lateral flight path display data 80, and ETA display data 82. The interface manager module 70 includes in the ETA display data 82 ETA minimum data 84 and ETA maximum data 86 representing the ETA minimum value 32 and the ETA maximum value 34, respectively. For example, the interface manager module 70 provides the user input 76 to the data manager module 72 and the data manager module 72, in return, provides the ETA minimum data 84, and the ETA maximum data 86.

The data manager module 72 receives as input the user input 76 from the interface manager module 70. Based on the user input 76, the data manager module 72 retrieves from the information datastore 14 ETA minimum data 88, ETA maximum data 90, and an optimal RTA value 91 that is pre-calculated for a given point on the flight path that is near or associated with the particular point 27. The data manager module 72 then interpolates the ETA minimum data 88 and the ETA maximum data 90 based on the current RTA tolerance 58, the waypoint distance offset 56. For example, simple linear interpolation from within ETA waypoint data or any other suitable interpolation considering internal segmentation of flight plan related data in the information datastore 14. The data manager module 72 then generates the ETA minimum data 84, the ETA maximum data 86 and the optimal RTA data 87 based on the results of the interpolation.

As can be appreciated, the data manager module 72 may similarly access the information datastore 14 for the fuel impact, the ETE values, the flown distance impact, and the other values as described above.

Figure 4:
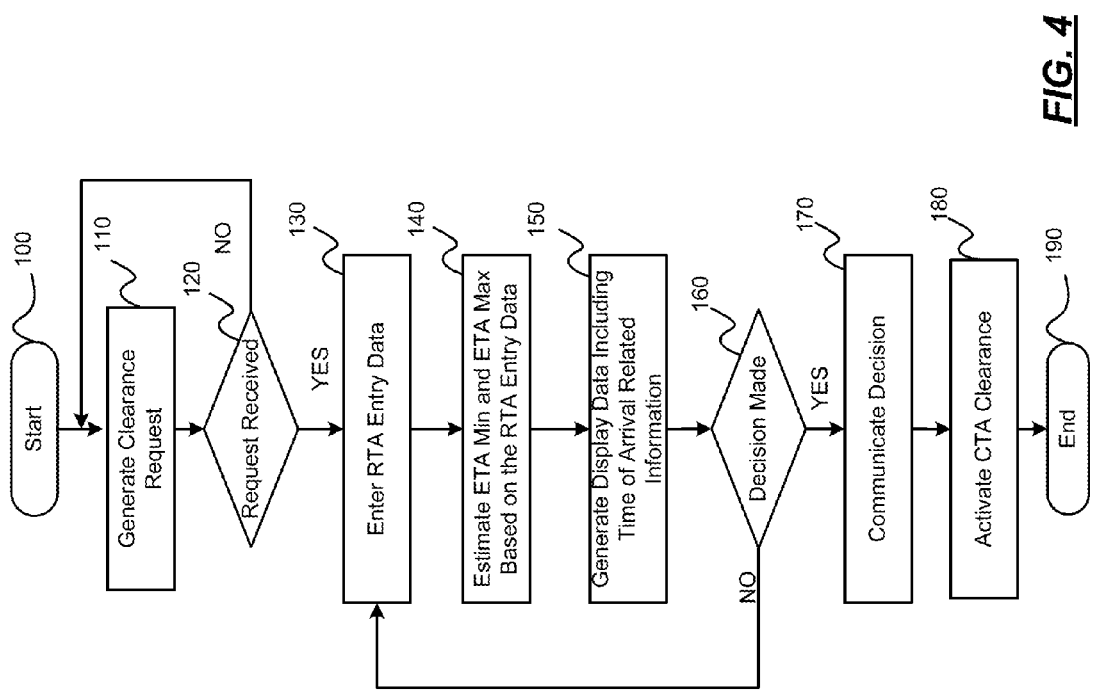
FIG. 4 is a flowchart illustrating an information display method that may be performed by the time of arrival determination module in accordance with exemplary embodiments.

Referring now to FIG. 4, and with continued reference to FIGS. 1-3, a flowchart illustrates a display method that can be performed by the time of arrival determination module 16 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method can be scheduled to run based on predetermined events (e.g., based on a CTA clearance operation as shown) or may be scheduled to run at predetermined time intervals. In one example, the method may begin at 100. A clearance request is generated by ATCo to comply with time based operation clearance (CTA or CTO) at 110. If a user (e.g., a pilot) does no receive the request at 120, another clearance request may be generated at 110.

When the user receives the clearance request at 120, the user inserts the RTA entry data 52 into the temporary flight plan, for example, in the form of a CROSS constrain by means of either graphical or textual interaction at 130. The time of arrival determination module 16 estimates the ETA minimum data 84, the ETA maximum data 86, and the optimal RTA data 87 based on the RTA entry data 52 at 140. The time of arrival determination module 16 generates the display data 78, 80, 82 to display the vertical flight path, the lateral flight path data, and the ETA data and any other time or arrival related information 21 at 150. The steps of 130-150 can be repeated any number of times by the user until a decision can be made based on ETA minimum and maximum data 84, 86 at 160. Once a decision is made at 160, the user communicates the decision to the ATCo at 170. The user then activates the CTA clearance, if possible, at 180. Thereafter, the method may end at 190.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying information on a display device of an aircraft, comprising:
    receiving data indicating a point selected by a user from any point along a trajectory of a flight path;
    determining an estimated time of arrival minimum and an estimated time of arrival maximum for the selected point;
    displaying in a dialogue box associated with the trajectory of the flight path the estimated time of arrival minimum and the estimated time of arrival maximum for the point;
    receiving a required time of arrival target time; and
    displaying the required time of arrival target time relative to the estimated time of arrival minimum and the estimate time of arrival maximum.

2. A method of displaying information on a display device of an aircraft, comprising:
    receiving data indicating a point selected by a user from any point along a trajectory of a flight path;
    storing pre-calculated estimated time of arrival minimum data and estimated time of arrival maximum data in a datastore;
    determining an estimated time of arrival minimum and an estimated time of arrival maximum for the selected point based on an interpolation of the estimated time of arrival minimum and the estimated time of arrival maximum data;
    displaying in a dialogue box associated with the trajectory of the flight path the estimated time of arrival minimum and the estimated time of arrival maximum for the point.

3. The method of claim 1, wherein the receiving the required time of arrival target time is based on user input from a user interacting with the dialogue box.

4. The method of claim 1, further comprising determining an optimal required time of arrival based on the point and displaying the optimal required time of arrival in relation to the estimated time of arrival minimum and the estimated time of arrival maximum.

5. The method of claim 1, further comprising selecting the point on the trajectory using a cross constrain interaction.

6. The method of claim 1, further comprising receiving a required time of arrival tolerance and wherein the determining the estimated time of arrival minimum and the estimated time of arrival maximum is based on the required time of arrival tolerance.

7. The method of claim 6, wherein the receiving the required time of arrival tolerance is based on user input from a user interacting with the dialogue box.

8. The method of claim 1, further comprising receiving a distance offset associated with the point and wherein the determining the estimated time of arrival minimum and the estimated time of arrival maximum is based on the distance offset.

9. The method of claim 8, wherein the receiving the distance offset is based on user input from a user interacting with the dialogue box.

10. A system for displaying information on a display device of an aircraft, comprising:
    an information datastore that stores pre-calculated estimated time of arrival minimum data and estimated time of arrival maximum data; and
    a computer module that receives data indicating a point selected by a user from any point along a trajectory of a flight path, that determines an estimated time of arrival minimum and an estimated time of arrival maximum for the selected point based on an interpolation of the estimated time of arrival minimum data and the estimated time of arrival maximum data from the information datastore; and that displays in a dialogue box associated with the trajectory of the flight path the estimated time of arrival minimum and the estimated time of arrival maximum for the point.

11. The system of claim 10, wherein the computer module receives a required time of arrival target time and displays the required time of arrival target time relative to the estimated time of arrival minimum and the estimate time of arrival maximum.

12. The system of claim 11, wherein the computer module receives the required time of arrival target time based on user input from a user interacting with the dialogue box.

13. The system of claim 10, wherein the computer module determines an optimal required time of arrival based on the point and displays the optimal required time of arrival in relation to the estimated time of arrival minimum and the estimated time of arrival maximum.

14. The system of claim 10, wherein the computer module selects the point on the trajectory using a cross constrain interaction.

15. The system of claim 10, wherein the computer module receives a required time of arrival tolerance and determines the estimated time of arrival minimum and the estimated time of arrival maximum based on the required time of arrival tolerance.

16. The system of claim 10, wherein the computer module receives a distance offset associated with the point and determines the estimated time of arrival minimum and the estimated time of arrival maximum based on the distance offset.

* * * * *